US011342632B2

(12) United States Patent
Lee et al.

(10) Patent No.: US 11,342,632 B2
(45) Date of Patent: May 24, 2022

(54) BATTERY MODULE

(71) Applicant: LG CHEM, LTD., Seoul (KR)

(72) Inventors: Jung-Hoon Lee, Daejeon (KR);
Dal-Mo Kang, Daejeon (KR);
Sang-Woo Ryu, Daejeon (KR);
Jeong-O Mun, Daejeon (KR);
Jin-Yong Park, Daejeon (KR);
Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 303 days.

(21) Appl. No.: 16/342,710

(22) PCT Filed: Jan. 5, 2018

(86) PCT No.: PCT/KR2018/000278
§ 371 (c)(1),
(2) Date: Apr. 17, 2019

(87) PCT Pub. No.: WO2018/225920
PCT Pub. Date: Dec. 13, 2018

(65) Prior Publication Data
US 2020/0044224 A1 Feb. 6, 2020

(30) Foreign Application Priority Data
Jun. 7, 2017 (KR) .................. 10-2017-0070875

(51) Int. Cl.
H01M 50/502 (2021.01)
B60R 16/033 (2006.01)
(Continued)

(52) U.S. Cl.
CPC ......... H01M 50/502 (2021.01); B60R 16/033 (2013.01); H01M 50/20 (2021.01);
(Continued)

(58) Field of Classification Search
CPC .. H01M 50/20; H01M 50/502; H01M 50/531; H01M 2220/20; H01R 4/027;
(Continued)

(56) References Cited

U.S. PATENT DOCUMENTS

2016/0233476 A1 8/2016 Okamoto et al.
2017/0125775 A1 5/2017 Chen et al.
2017/0331097 A1 11/2017 Lee et al.

FOREIGN PATENT DOCUMENTS

EP 2 535 962 A2 12/2012
JP 2600369 B2 4/1997
(Continued)

OTHER PUBLICATIONS

English translation of KR Publication 2015-0056705, May 2015.*
(Continued)

Primary Examiner — Brittany L Raymond
(74) Attorney, Agent, or Firm — Birch, Stewart, Kolasch & Birch, LLP

(57) ABSTRACT

A battery module includes a plurality of pouch-type secondary batteries arranged to be stacked in at least one direction, each secondary battery having an electrode lead, and a bus bar made of an electrically conductive material and bonded to at least two electrode leads of corresponding secondary batteries to electrically connect the corresponding secondary batteries to each other. Each bonded electrode lead may be configured to protrude from the corresponding secondary battery in a front and rear direction, and at least one of left and right side surfaces of each bonded electrode lead may be bonded to the bus bar.

15 Claims, 11 Drawing Sheets

(51) Int. Cl.
  *H01R 4/02* (2006.01)
  *H01M 50/20* (2021.01)
  *H01M 50/531* (2021.01)
  *B60L 50/64* (2019.01)
  *B60K 6/28* (2007.10)
  *H01R 43/02* (2006.01)

(52) U.S. Cl.
  CPC .......... *H01M 50/531* (2021.01); *H01R 4/029* (2013.01); *B60K 6/28* (2013.01); *B60L 50/64* (2019.02); *B60Y 2200/91* (2013.01); *B60Y 2200/92* (2013.01); *B60Y 2400/112* (2013.01); *H01M 2220/20* (2013.01); *H01R 4/027* (2013.01); *H01R 43/0263* (2013.01)

(58) Field of Classification Search
  CPC ..... H01R 4/029; H01R 43/0263; Y02E 60/10; B60K 6/28; B60L 50/64; B60R 16/033; B60Y 2200/91; B60Y 2200/92; B60Y 2400/112
  See application file for complete search history.

(56) References Cited

FOREIGN PATENT DOCUMENTS

| | | | |
|---|---|---|---|
| JP | 2004-327310 | A | 11/2004 |
| JP | 2010-205535 | A | 9/2010 |
| JP | 2011-249243 | A | 12/2011 |
| JP | 2012-515418 | A | 7/2012 |
| JP | 2013-187046 | * | 9/2013 |
| JP | 2013-187046 | A | 9/2013 |
| JP | 2014-22239 | A | 2/2014 |
| JP | 2015-11844 | A | 1/2015 |
| JP | 2015-056342 | A | 3/2015 |
| KR | 10-2013-0029982 | A | 3/2013 |
| KR | 10-1329250 | B1 | 11/2013 |
| KR | 10-2014-0137044 | * | 12/2014 |
| KR | 10-2014-0137044 | A | 12/2014 |
| KR | 10-2015-0056705 | * | 5/2015 |
| KR | 10-1547400 | B1 | 8/2015 |
| KR | 10-2018-0077765 | A | 7/2016 |
| WO | WO 2010/081085 | A1 | 7/2010 |

OTHER PUBLICATIONS

European Search Report for Application No. 18812600.7 dated Jan. 31, 2020.

International Search Report (PCT/ISA/21 0) issued in PCT/KR2018/000278, dated Aug. 8, 2018.

* cited by examiner

BATTERY MODULE

TECHNICAL FIELD

The present disclosure relates to a battery module accommodating two or more secondary batteries, and more particularly, to a battery module having improved process efficiency for a bonding process between an electrode lead and a bus bar of a secondary battery, and a battery pack and a vehicle including the battery module.

The present application claims priority to Korean Patent Application No. 10-2017-0070875 filed on Jun. 7, 2017 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a pouch exterior, sealably containing the electrode assembly together with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, pouch-type secondary batteries are widely used for the middle-sized or large-sized devices since they may be easily stacked.

In order to electrically connect the secondary batteries inside a battery module, electrode leads are connected to each other, and the connection portions may be welded to maintain the connected state. Further, the battery module may have parallel and/or series electrical connections between the secondary batteries. For this, one end of the electrode lead may be fixed in contact to the bus bar by welding or the like for electrical connection between to each secondary battery.

The electrical connection between secondary batteries is generally made by bonding the electrode leads to the bus bar. At this time, in order to electrically connect secondary batteries in parallel, electrode leads of the same polarity are connected and bonded to each other. Also in order to electrically connect secondary batteries in series, electrode leads of different polarities are connected and bonded to each other.

In this bonding process, if electrode leads that should not be connected to each other come into contact with each other, an internal short circuit may occur, which may damage the battery pack and, in severe cases, cause ignition or explosion. Meanwhile, if electrode leads that should be connected to each other are separated from each other, power may not be normally supplied from the battery module, which may make power insensitive or reduce the capacity or output of the battery module. If the power insensitivity occurs in this way, a device equipped with the battery module, such as a vehicle, may stop its operation, which may lead to a serious accident.

Thus, the contact state of the electrode leads needs to maintain stable as originally intended and the unintended contact or separation between the electrode leads should not occur. Further, a battery module used in a vehicle or the like may be frequently exposed to vibration or impact, and thus it is continuously demanded to develop a battery module that is capable of stably maintaining a connection state of the electrode leads in spite of vibration or impact.

In addition, in the battery module, it is necessary to ensure the weldability together with the stability for the connection between the electrode leads. For example, even though the connection between the electrode leads is stable, if the welding demands a very difficult work, it is possible to deteriorate the productivity of the battery module and to increase the likelihood of defects.

In particular, the battery module may include a bus bar for electrically connecting secondary batteries, and the bus bar need to be in contact with the electrode lead in order to be welded to the electrode lead. Thus, it is necessary to provide a structure for facilitating the welding work to a bonding portion between the electrode lead and the bus bar so that the electrode lead and the bus bar may be connected well while the battery module is being manufactured. Further, a plurality of electrode leads and bus bars may be bonded by laser welding or the like in order to maintain a stable connection state. In this case, it is desirable to provide a module structure with excellent weldability.

However, in the conventional battery module, for stable bonding between the electrode lead of the secondary battery and the bus bar, it is inevitable that one end of the electrode lead is bent so that one side surface of the electrode lead having a relatively large area comes in contact with the bus bar, and then the bent one side surface of the electrode lead is bonded to a front surface of the bus bar.

In the bonding process, the work for bending the electrode lead to contact the bus bar should be additionally performed, and an additional bending jig is required for this work. Accordingly, the welding process between the electrode lead and the bus bar becomes complicated and needs more operation time and cost.

In addition, when the work such as laser welding is performed for bonding the bus bar and the electrode lead, the electrode leads are easily connected to each other during the welding work since there is a very narrow space between the electrode leads of the stacked secondary batteries, and it is very difficult to carry out the welding without damaging the secondary batteries.

Moreover, the bent area of the electrode lead as mentioned above becomes a cause that needs more work space in the welding process. For example, when the welding process is performed for bonding, a welding spot between the bent portion of the electrode lead and the bus bar is needed, an allowance for the welding spot is also required, and the area for disposing a welding jig for closely adhering the electrode lead in a bent form to the bus bar is also required. For this reason, the space for the welding work becomes narrower, thereby deteriorating the welding efficiency.

In particular, as the thickness of the secondary battery is gradually reduced due to the recent trend for a lightweight design, the space for the bonding process between the electrode lead and the bus bar is becoming narrower. That is, if a bending direction of one end of the electrode lead is identical to a stacking direction of the secondary batteries, the thickness of the secondary battery in the stacking direction is small, which may easily cause interference or damage between neighboring secondary batteries while welding the electrode lead and the bus bar, thereby making it very difficult to perform the welding work and increasing the process time.

DISCLOSURE

Technical Problem

The present disclosure is designed to solve the problems of the related art, and therefore the present disclosure is directed to providing a battery module, which may ensure the reliable electrical connection and improved welding efficiency between an electrode lead and a bus bar, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of pouch-type secondary batteries arranged to be stacked in at least one direction, each secondary battery having an electrode lead; and a bus bar made of an electrically conductive material and bonded to at least two electrode leads of corresponding secondary batteries to electrically connect the corresponding secondary batteries to each other.

Here, each bonded electrode lead may be configured to protrude from the corresponding secondary battery in a front and rear direction, and at least one of left and right side surfaces of each bonded electrode lead may be bonded to the bus bar.

Also, the bus bar may include a main frame having at least one hole formed therein so that one end of each bonded electrode lead extends therethrough.

Further, the main frame may include a bar-shaped top bar located at an upper portion of the main frame and extending in a horizontal direction, when the main frame stands up in an upper and lower direction; a bar-shaped bottom bar located at a lower portion of the main frame and extending in the horizontal direction; and an extension configured to connect the top bar and the bottom bar.

In addition, the extension may have at least one inclined surface so that a thickness of the extension in the horizontal is continuously increased in a direction along which each bonded electrode lead is inserted into the hole.

Also, the extension may have at least one opening perforated in the direction along which each bonded electrode lead is inserted into the hole.

Further, the bus bar may include a bonding plate having a front surface, a rear surface and side portions, based on the front and rear direction, and one side portion of the bonding plate may be bonded to one side surface of the left or right side surface of one of the bonded electrode leads.

In addition, the bonding plate may be bonded to the main frame so that an outwardly exposed front surface of the bonding plate protrudes to the front, based on an outwardly exposed front surface of the main frame.

Meanwhile, the bus bar may further include at least one fixing plate closely adhered to the one of the bonded electrode leads of the secondary battery.

Further, the fixing plate may press the other side surface of the left or right side surface of the one of the bounded electrode leads so that the one side surface of the one of the bonded electrode leads is closely adhered to the one side portion of the bonding plate.

Meanwhile, at least one protrusion may be formed at the one side portion of the bonding plate to protrude in a left direction or a right direction.

Further, the protrusion may be bonded to an upper or lower surface of one end of the one of the bonded electrode leads.

In addition, the at least one protrusion may be formed at a top portion or a bottom portion of the one side portion of the bonding plate, or the top portion and the bottom portion of the one side portion of the bonding plate.

Meanwhile, the bus bar may include at leak one guide plate, the guide plate being connected to the fixing plate, and the guide plate being configured to move the fixing plate in a left direction and a right direction.

Also, at least one protrusion may be formed at each of the side portions of the bonding plate.

In another aspect of the present disclosure, there is also provided a battery pack, comprising a battery module according to the present disclosure.

In another aspect of the present disclosure, there is also provided a vehicle, comprising a battery pack according to the present disclosure.

Advantageous Effects

According to an embodiment of the present disclosure, the battery module is configured such that the electrode lead of the secondary battery protrudes from the secondary battery in the front and rear direction and at least one of left and right side surfaces of the electrode lead is bonded to the bus bar, thereby making a reliable electrical connection between the electrode lead and the bus bar without forming a bent structure at the electrode lead.

Thus, in the bonding process for manufacturing the battery module of the present disclosure, an operation for bending the electrode lead to contact the bus bar may be excluded, and a work for bending the electrode lead and a bending jig are not required, thereby reducing the manufacture cost and shortening the working time.

In addition, according to another embodiment of the present disclosure, it is possible to prevent the problem of deteriorating the manufacture efficiency since more space is necessary for the welding process due to a bent portion of the electrode lead to be bonded to the bus bar, different from the conventional technique.

Moreover, according to an embodiment of the present disclosure, since the bus bar has a bonding plate, it is possible to increase the contact area between the bus bar and the electrode lead and to improve the efficiency of the welding work between one end of the electrode lead and the bus bar.

In addition, according to an embodiment of the present disclosure, since a fixing plate for being additionally bonded to the electrode lead is provided, it is possible to make a reliable bonding between the bus bar and the electrode lead.

Further, according to an embodiment of the present disclosure, since the bus bar may be prepared in various shapes, it is possible to prevent the bus bar installed at the battery module from being interfered with an external object and to make a compact battery module by enhancing the space utilization of components.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The embodiments of the present disclosure are provided to more fully describe the present disclosure to those skilled in the art, and the shape and size of components in the figures may be exaggerated, omitted or schematically illustrated for better understanding. Thus, the size or ratio of components does not entirely reflect an actual size or ratio.

Figure 1:
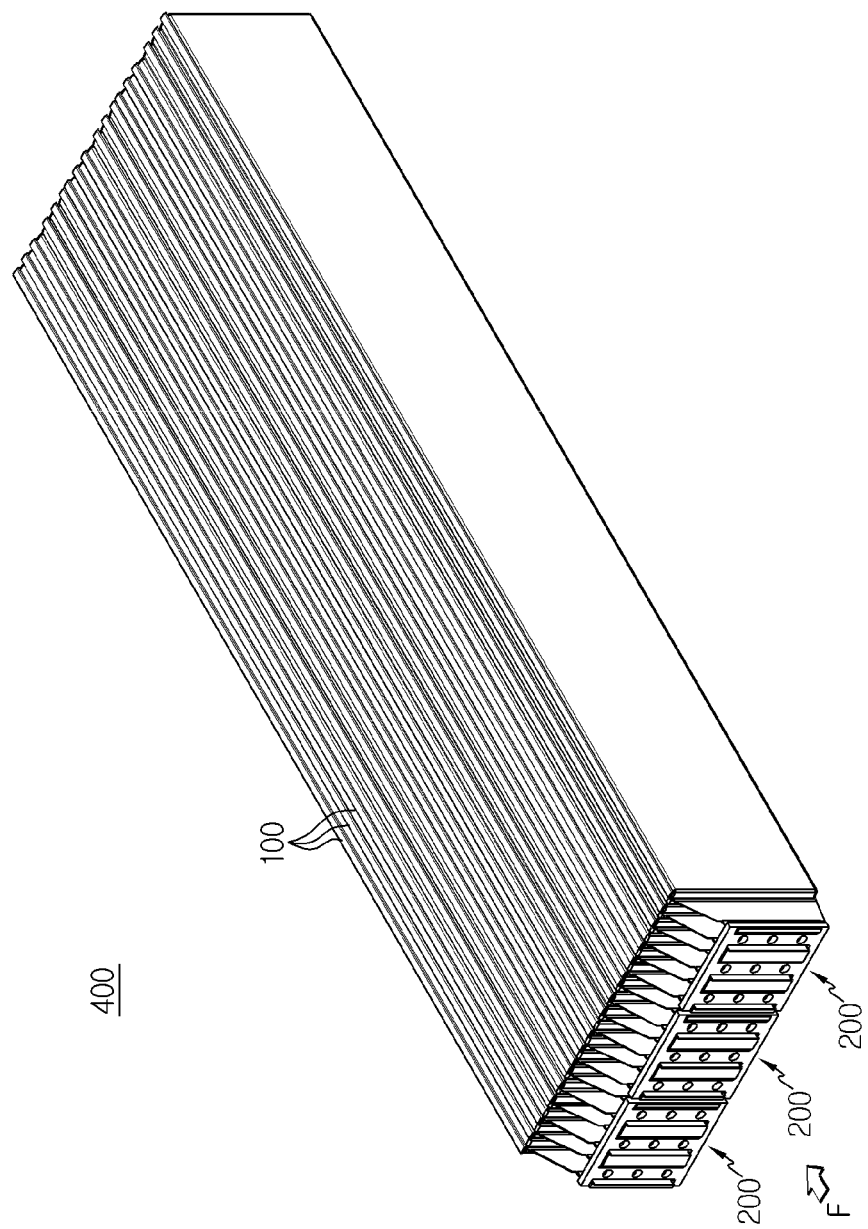
FIG. 1 is a perspective view schematically showing components of a battery module according to an embodiment of the present disclosure.
Figure 2:
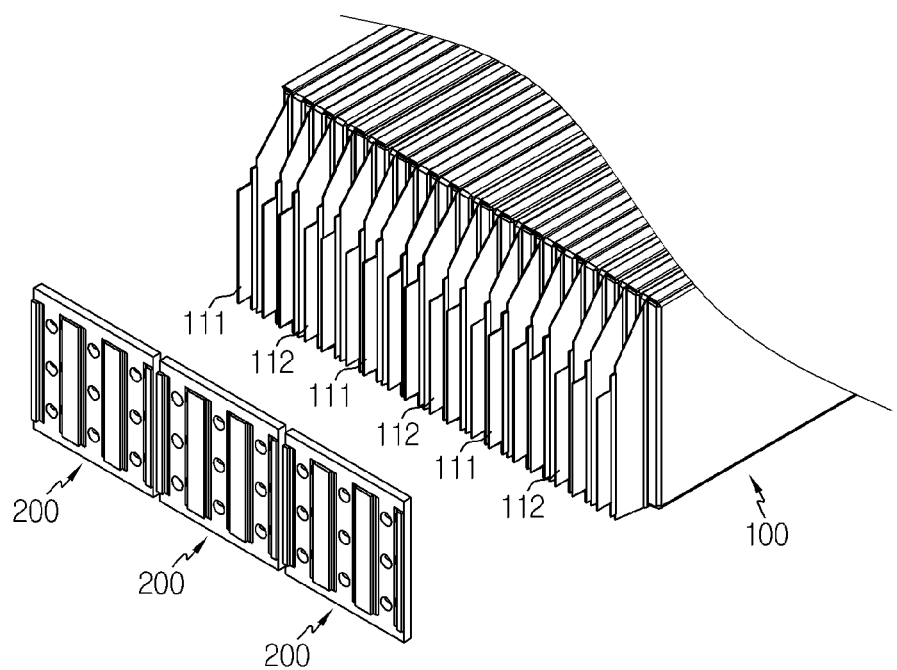
FIG. 2 is an exploded perspective view showing only a part of components of the battery module of FIG. 1.

FIG. 1 is a perspective view schematically showing components of a battery module according to an embodiment of the present disclosure. Also, FIG. 2 is an exploded perspective view showing only a part of components of the battery module of FIG. 1. In addition, FIG. 3 is a partially enlarged view showing secondary batteries of the battery module according to an embodiment of the present disclosure, observed from the above.

Figure 3:
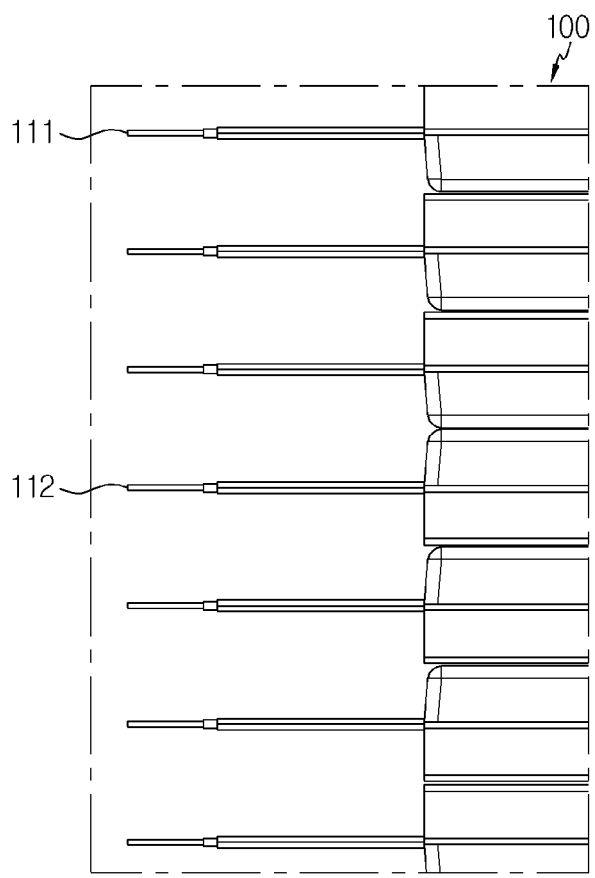
FIG. 3 is a partially enlarged view showing secondary batteries of the battery module according to an embodiment of the present disclosure, observed from the above.

Referring to FIGS. 1 to 3, a battery module 400 according to the present disclosure may include a plurality of secondary batteries 100 and bus bars 200.

The secondary battery 100 may be a pouch-type secondary battery 100. In particular, the pouch-type secondary battery 100 may include an electrode assembly, an electrolyte and a pouch exterior.

Here, the electrode assembly may be configured such that at least one positive electrode plate and at least one negative electrode plate are disposed with a separator interposed therebetween. More specifically, the electrode assembly may be classified into a wound type in which one positive electrode plate and one negative electrode plate are wound together with a separator, a stacking type in which a plurality of positive electrode plates and a plurality of negative electrode plates are alternately stacked with a separator interposed therebetween, and the like.

Also, the pouch exterior may be configured to have an outer insulating layer, a metal layer and an inner adhesive layer. The pouch exterior may be configured to include a metal thin film, for example an aluminum thin film, in order to protect inner components such as the electrode assembly and the electrolyte, to enhance electrochemical properties by the electrode assembly and the electrolyte, and to improve heat dissipation. In addition, the aluminum thin film may be interposed between insulating layers made of an insulating material so as to secure electrical insulation with components inside the secondary battery 100 such as the electrode assembly and the electrolyte or with other components outside the secondary battery 100.

In particular, the pouch exterior may be composed of two pouches, at least one of which may have a concave inner space formed therein. In addition, the electrode assembly may be accommodated in the inner space of the pouch. Also, sealing portions are provided at outer circumferential surfaces of two pouches, and the sealing portions are fused to each other to seal the inner space in which the electrode assembly is accommodated.

Each pouch-type secondary battery 100 may include an electrode lead 111, and the electrode lead 111 may include a positive electrode lead 111 and a negative electrode lead 112. Here, as shown in FIG. 2, the electrode leads 111, 112 may have a plate form and be disposed to stand in a direction substantially perpendicular to the ground, when being observed in a F direction (see FIG. 1), and two broad surfaces thereof are located at left and right sides, respectively.

More specifically, the left and right side surfaces of the electrode leads 111, 112 are formed as upper and lower broad surfaces and protrude from the sealing portion of the pouch exterior located in a front and rear direction. The electrode leads 111, 112 may serve as electrode terminals of the secondary battery 100.

Further, the positive electrode lead 111 and the negative electrode lead 112 may be provided in opposite directions with respect to the center of the secondary battery 100. In other words, each secondary battery 100 may be configured such that the electrode leads 111, 112 protrude forward and backward, respectively. For example, as shown in FIG. 3, one electrode lead 111 may be configured to protrude forward from the secondary battery 100, and the other electrode lead 112 may configured to protrude rearward from the secondary battery 100.

Thus, according to this configuration of the present disclosure, in one secondary battery 100, there is no interference between the positive electrode lead 111 and the negative electrode lead 112, thereby widening the area of the electrode lead 111. In addition, a welding process between the electrode leads 111 and a welding process between the electrode lead 111 and the bus bar 200 may be performed more easily.

A plurality of pouch-type secondary batteries 100 may be included in the battery module 400 and arranged to be stacked in at least one direction. For example, as shown in FIG. 1, a plurality of pouch-type secondary batteries 100 may be stacked in a horizontal direction. At this time case, each pouch-type secondary battery 100 may be disposed to stand approximately perpendicular to the ground, when being observed in the F direction, such that two broad surfaces are located at right and left sides, respectively, and the sealing portions are located at upper, lower, front and rear sides. In other words, each secondary battery 100 may be configured to stand in an upper and lower direction.

Meanwhile, the terms indicating directions such as front, rear, left, right, upper and lower directions may be changed depending on the position of an observer or the shape of an object. For the sake of convenience of description, in the present specification, directions are classified into front, rear, left, right, upper and lower directions, based on the F direction.

The configuration of the pouch-type secondary battery 100 described above is obvious to those skilled in the art and thus is not described in detail. In addition, the battery module 400 according to the present disclosure may employ various secondary batteries 100 known at the time of filing of this application.

Meanwhile, the battery module 400 may include a bus bar 200.

Here, the bus bar 200 may be made of an electrically conductive metal material having relatively high electric conductivity. For example, the bus bar 200 may have at least one electrically conductive material selected from nickel, copper, aluminum, lead and tin. As an example, the bus bar 200 may include a copper material. However, the present disclosure is not necessarily limited thereto, and various metals may also be used as the material of the bus bar 200.

Also, the bus bar 200 may be bonded to at least two of the electrode leads 111, 112 of the plurality of secondary batteries 100 to electrically connect the plurality of secondary batteries 100.

For example, the bus bar 200 may bond two or more electrode leads 111 having the same polarity so that the plurality of secondary batteries 100 are electrically connected in parallel. Alternatively, the bus bar 200 may bond the electrode leads 111, 112 having different polarities so that the plurality of secondary batteries 100 are electrically connected in series. Moreover, the bus bar 200 may electrically connect the plurality of secondary batteries 100 both in parallel and in series.

In particular, in the battery module 400 of the present disclosure, at least one of the left and right side surfaces of the electrode lead 111 protruding from the secondary battery 100 in the front and rear direction may be bonded to the bus bar 200.

According to this configuration of the present disclosure, in the battery module 400 of the present disclosure, since the side surface at the end of the electrode lead 111 protruding in the front and rear direction is bonded to the bus bar 200, the electrode lead 111 and the bus bar 200 may be reliably bonded without forming a bent structure at the electrode lead 111, different from the conventional technique. Accordingly, the bonding process between the electrode lead 111 and the bus bar 200 may be performed more easily, and the process time is reduced.

In addition, at one end of the electrode lead 111, at least one of the left and right side surfaces of the electrode lead 111 having a relatively larger area than the upper and lower side surfaces thereof may be bonded to the bus bar 200.

Moreover, the electrode lead 111 may extend straight along the front and rear direction along which the electrode lead 111 protrudes. However, the present disclosure is not necessarily limited to the above structure of the electrode lead, and in some cases, one end of the electrode lead 111 may be bent with a predetermined angle with respect to the front and rear direction along which the electrode lead 111 protrudes, so as to be bonded to a portion of the bus bar 200. For example, the electrode lead 111 may be bent in a range of less than 30 degrees with respect to the front and rear direction along which the electrode lead 111 protrudes.

Figure 4:
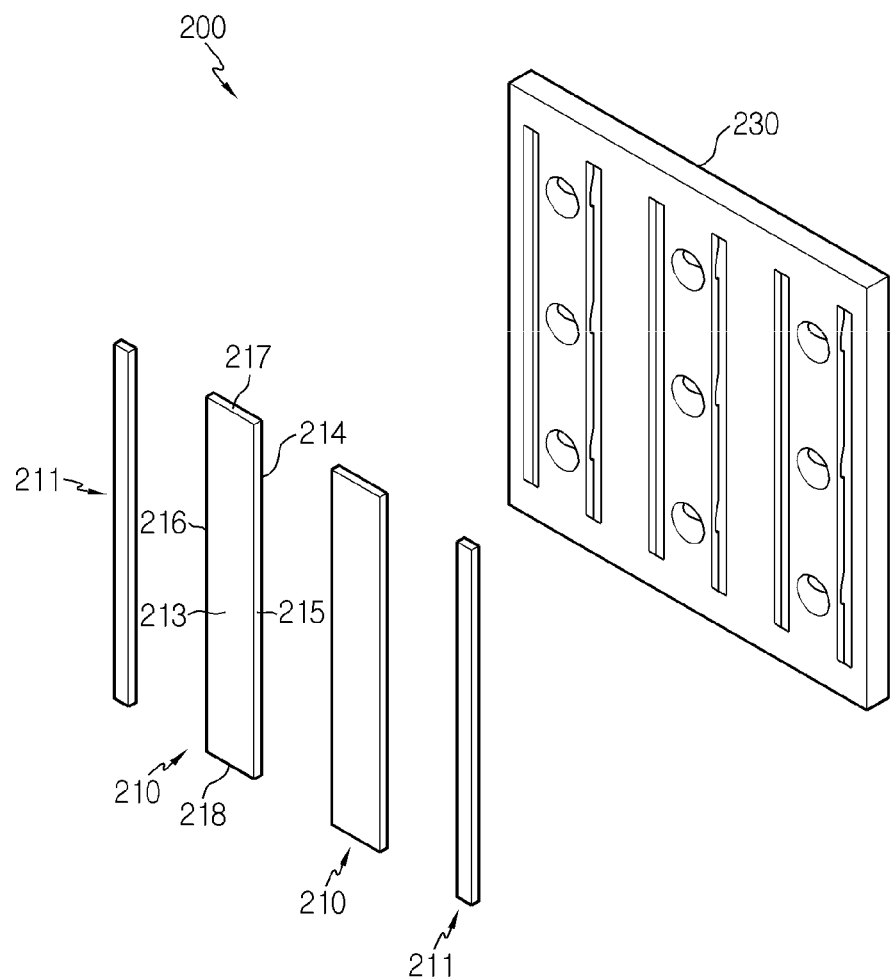
FIG. 4 is an exploded perspective view showing various components of a bus bar employed at the battery module of FIG. 1.
Figure 5:
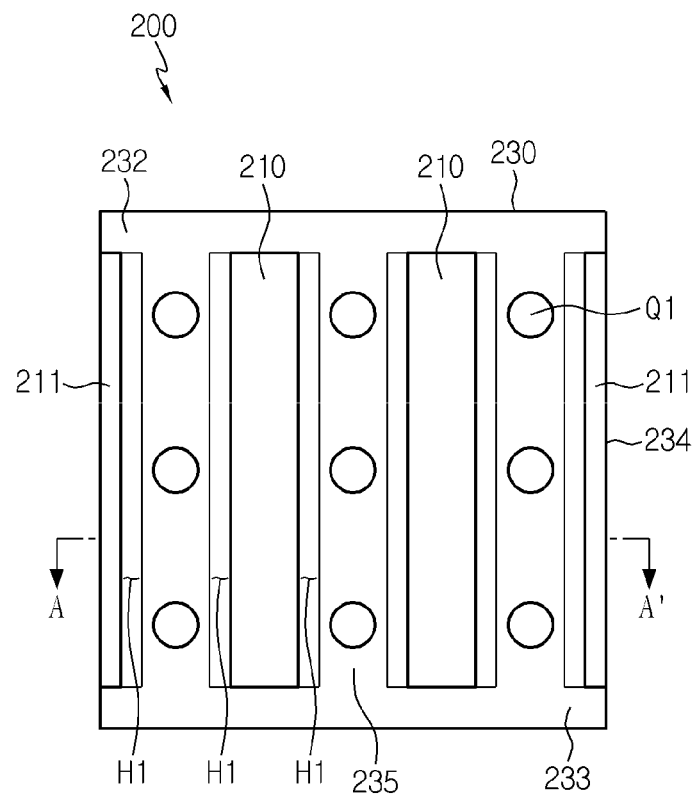
FIG. 5 is a front view showing an example of the bus bar employed at the battery module of FIG. 1.
Figure 6:
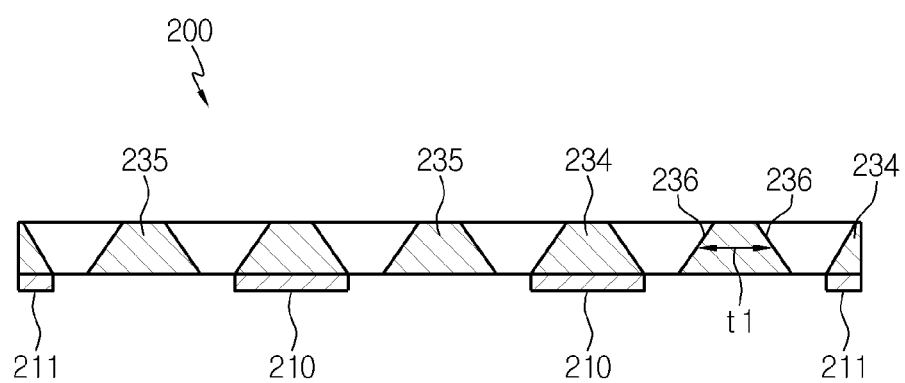
FIG. 6 is a cross-sectioned view showing an example of the cross section, taken along the line A-A' of FIG. 5.
Figure 7:
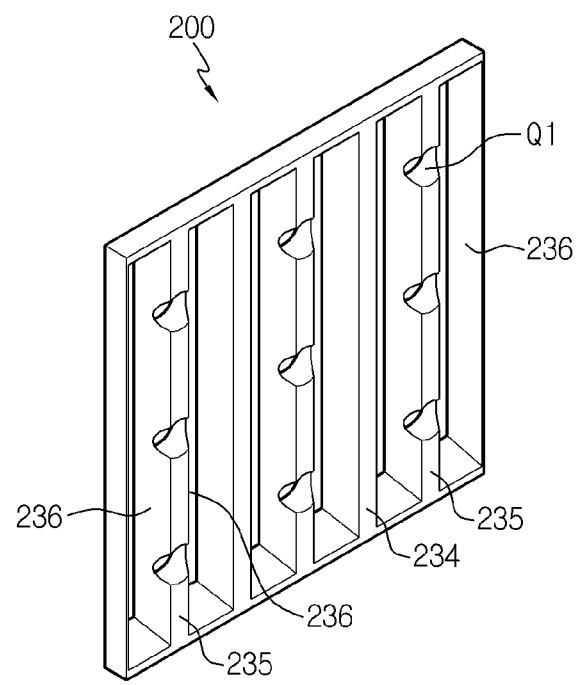
FIG. 7 is a rear perspective view showing an example of the bus bar employed at the battery module of FIG. 1.

FIG. 4 is an exploded perspective view showing various components of a bus bar employed at the battery module of FIG. 1. FIG. 5 is a front view showing an example of the bus bar employed at the battery module of FIG. 1. FIG. 6 is a cross-sectioned view showing an example of the cross section, taken along the line A-A' of FIG. 5. In addition, FIG. 7 is a rear perspective view showing an example of the bus bar employed at the battery module of FIG. 1.

Referring to FIGS. 4 to 7, the bus bar 200 may include a main frame 230 and bonding plates 210, 211.

Here, the main frame 230 may be made of an electrically conductive metal material having relatively high electric conductivity. For example, the main frame 230 may include at least one electrically conductive material selected from nickel, copper, aluminum, lead and tin. As an example, the main frame 230 may include a copper material. However, the present disclosure is not necessarily limited thereto, and various metals may be used as the material of the main frame 230.

Also, at least one hole H1 may be formed in the main frame 230. More specifically, the hole H1 may be formed at a position corresponding to the electrode lead 111 so that the electrode lead 111 is positioned inside the main frame 230 without a bent structure. Further, the hole H1 may be shaped such that a distal end of the electrode lead 111 is easily inserted therein, and may have, for example, a rectangle having a width and breadth similar to or larger than those of the distal end of the electrode lead 111.

According to this configuration of the present disclosure, in the battery module 400 of the present disclosure, the electrode lead 111 extending straight without a bent structure may be inserted into the hole H1 without interfering with the main frame 230 and then bonded to the bus bar 200.

In addition, the main frame 230 may include a top bar 232, a bottom bar 233 and extensions 234, 235.

Here, when the main frame 230 stands in the upper and lower direction, the top bar 232 may have a bar shape located at an upper portion of the main frame 230 and extending in a horizontal direction.

Also, the bottom bar 233 may have a bar shape located at a lower portion of the main frame 230 and extending in a horizontal direction.

In addition, the extensions 234, 235 may be configured to connect the top bar 232 and the bottom bar 233. More specifically, the extensions 234, 235 may have a rib shape extending from the top bar 232 in a lower direction and connected to the bottom bar 233. Also, the hole H1 may be formed between the extensions 234, 235. As shown in FIG. 7, the main frame 230 of the bus bar 200 may have seven extensions 234, 235 configured to connect the top bar 232 and the bottom bar 233.

Referring to FIG. 6 again, the extensions 234, 235 may have at least one inclined surface 236. Specifically, the inclined surface 236 may be formed at the extensions 234, 235 such that the thickness t1 of at least one part of the extensions 234, 235 in the left and right direction is capable of continuously increasing in a direction along which the electrode lead 111 is inserted, namely in a direction from an inner side to an outer side. That is, as shown in FIG. 7, in the main frame 230 of the bus bar 200, the inclined surface 236 may be formed at one side surface or both side surfaces of the extensions 234, 235 to be inclined from an inner side to an outer side.

According to this configuration, in the battery module 400 according to the present disclosure, even though the electrode lead 111 is interfered with the main frame 230 while being inserted into the hole H1, the electrode lead 111 may be guided and inserted into the hole H1 along the inclined surface 236 formed at the extension 235. Accordingly, in the present disclosure, the electrode lead 111 may be easily inserted into the bus bar 200 that may facilitate the manufacturing process of the battery module 400, give a benefit for automation and improve the manufacturing efficiency.

In addition, at least one of the extensions 234 and 235 may have at least one opening Q1 formed therein. At this time, the opening Q1 may be formed in at least one extension 234, 235. Also, at least one opening Q1 may be formed in one extension 235.

However, the present disclosure is not limited to the configuration where the opening Q1 is formed in all the extensions 234, 235 provided at the main frame 230, but may also be configured such that the opening Q1 is formed only in a part of the extensions 235. For example, as shown in FIG. 7, the openings Q1 may be formed only in three extensions 235, among seven extensions 234, 235 of the main frame 230.

Specifically, the opening Q1 may be formed identical to the direction in which the electrode lead 111 is inserted into the hole H1, for example in the front and rear direction of the battery module 400. As shown in FIG. 7, when the main frame 230 of the bus bar 200 stands in the upper and lower direction, the opening Q1 may be formed respectively at upper, middle and lower portions of the extension 235 in a direction identical to the direction in which the electrode lead 111 is inserted into the hole H1, namely in a direction from an inner side to an outer side.

According to this configuration, in the main frame 230, the volume and weight of the bus bar 200 may be effectively reduced according to the number and size of the openings Q1 formed in the extension 235, which may also be helpful for reducing the weight of the battery module 400.

Meanwhile, the bus bar 200 may include bonding plates 210, 211 bonded and electrically connected to the electrode lead 111.

Referring to FIG. 4 again, the bonding plate 210 may have a front surface 213, a rear surface 214 and side portions 215, 216, 217, and 218, based on the front and rear direction. Here, the 'side portion' may be a portion that becomes an outer edge of the bonding plates 210, 211. However, this portion is not necessarily limited to the term 'side portion' but may be expressed as a side, an edge, an edge portion or the like on occasions.

Further, the front surface 213 and the rear surface 214 of the bonding plate 210 may be formed to have a larger area than the side portions 215, 216, 217, 218.

In addition, the bonding plates 210, 211 may be located at the front surface of the main frame 230. In addition, a plurality of bonding plates 210, 211 may be located to be spaced apart from each other in a state of standing up in an upper and lower direction.

Figure 8:
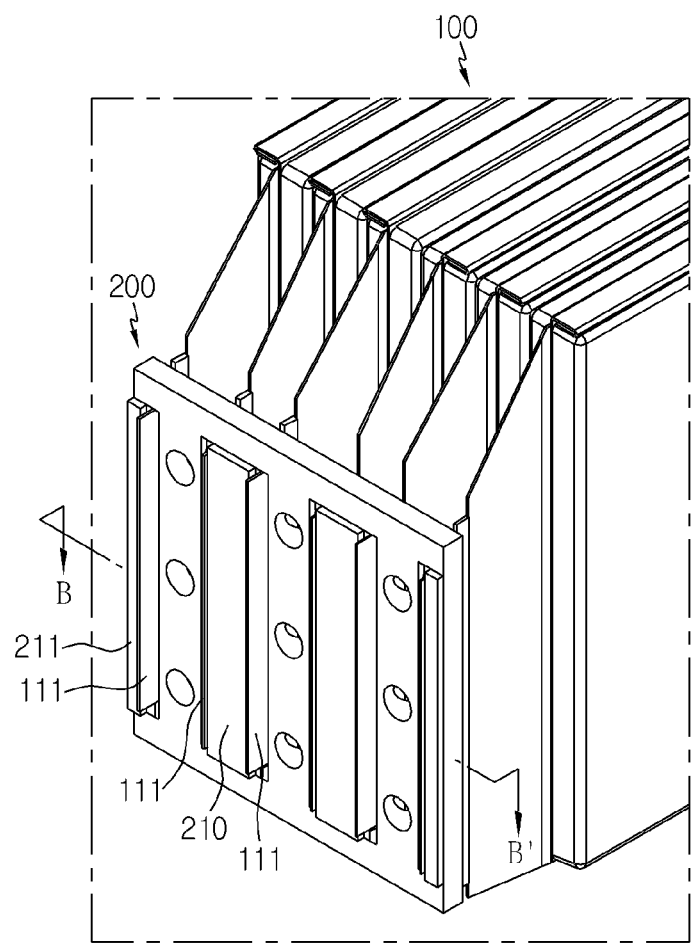
FIG. 8 is a perspective view showing an example of some secondary batteries and bus bars employed at the battery module of FIG. 1.

FIG. 8 is a perspective view showing an example of some secondary batteries and bus bars employed at the battery module of FIG. 1. In addition, FIG. 9 is a cross-sectioned view showing an example of the cross section, taken along the line B-B' of FIG. 8.

Figure 9:
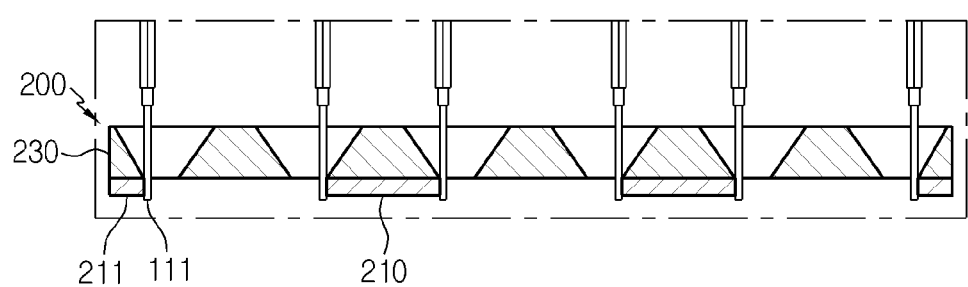
FIG. 9 is a cross-sectioned view showing an example of the cross section, taken along the line B-B' of FIG. 8.

Referring to FIGS. 8 and 9 along with FIG. 4, among the side portions 215, 216, 217, 218 of the bonding plates 210, 211, the side portions 215, 216 in the left and right direction may be bonded to the left or right side surface of the electrode lead 111. That is, one side portion 215 and/or the other side portion 216 of the bonding plates 210, 211 may be partially bonded to the electrode lead 111.

For example, as shown in FIGS. 4 and 5, the electrode leads 111 may be bonded to one side portion or the other side portion of the bonding plates 211 in the left and right direction, which are formed at both left and right side ends of the main frame 230. In addition, the electrode lead 111 may be bonded to one side portion 215 and the other side portion 216 of the bonding plates 210, except for the bonding plates 211 formed at both side ends of the main frame 230.

Here, the electrode lead 111 and the bonding plate 210 may be bonded by welding. Specifically, after one end of the electrode lead 111 and a part of the bonding plate 210 are heated and melted by means of welding, one end of the electrode lead and the bonding plate 210 may be bonded while the melted metals are being mixed with each other. For example, the bonding plate 210 and two electrode leads 111 may be welded by irradiating laser in a laser welding method, in a state where they are in contact with each other.

That is, during the welding process, one end of the electrode lead 111 of the bonding plate 210 may be melted, and the melted metal may contact and be bonded to the side portion of the bonding plate 210.

According to this configuration of the present disclosure, the bus bar 200 of the present disclosure is bonded to the side portion of the bonding plate 210 in a state where the electrode lead 111 is inserted into the hole H1 in the front and rear direction along which the electrode lead 111 protrudes, thereby forming a reliable bonding structure between the electrode lead 111 and the bus bar 200. Accordingly, it is possible to exclude a process of bending an end of the electrode lead 111, and thus the manufacturing time and cost may be effectively reduced.

Meanwhile, the bonding plate 210 may be bonded to the front surface of the main frame 230. For example, as shown in FIG. 6, four bonding plates 210, 211 may be bonded to the main frame 230 so that their front surfaces protrude forward with respect to the front surface of the main frame 230 exposed to the outside. According to this configuration, the side portion of the bonding plate 210 protrudes further to the front surface of the main frame 230, and thus a bonding process between the protruding side portion and one end of the electrode lead 111 may be easily performed.

In addition, bonding plates 210, 211 according to another embodiment of the present disclosure may be configured to be positioned in front of the distal end of the electrode lead 111. By this configuration, in one side portion 215 or the other side portion 216 of the bonding plate 210, which is positioned in front of the distal end of the electrode lead 111, only a region corresponding to an inner side with respect to the front surface of the bonding plate 210 may be bonded to left and right side surfaces of one end of the electrode lead 111.

According to this configuration of the present disclosure, the bus bar 200 of the present disclosure may prevent the electrode lead 111 from being separated from the bus bar 200 due to impact or interference of an external object.

Figure 10:
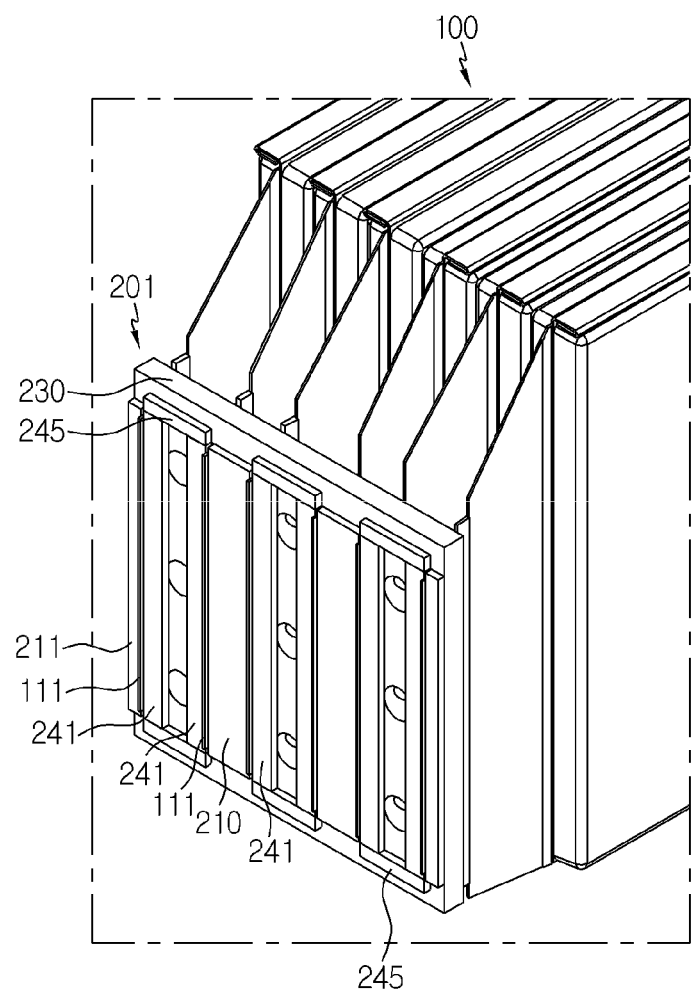
FIG. 10 is a perspective view showing an example of only secondary batteries and bus bars employed at a battery module according to another embodiment of the present disclosure.

FIG. 10 is a perspective view showing an example of only secondary batteries and bus bars employed at a battery module according to another embodiment of the present disclosure.

Referring to FIG. 10, a bus bar 201 may further include at least one fixing plate 241 closely adhered to the electrode lead 111 of the secondary battery 100.

In addition, the fixing plate 241 may have a material with a melting point higher than the melting point of the electrode lead 111. For example, the fixing plate 241 may be made of steel, stainless steel, or the like. According to this configuration, when the electrode lead 111 and the bonding plates 210, 211 are bonded to together by welding, the fixing plate having a relatively high melting point is not melted, thereby preventing the fixing plate 241 from being melted and thus bonded to the melted electrode lead 111.

Further, the fixing plate 241 may have a material with low electric conductivity. For example, the fixing plate 241 may be made of a non-conductive plastic material.

In addition, the fixing plate 241 may have a front surface, a rear surface and side portions, based on a front and rear direction. In detail, the fixing plate 241 may be formed such that the front surface and the rear surface thereof are relatively larger than the side portions.

For example, as shown in FIG. 10, the fixing plate 241 may be positioned at the front surface of the main frame 230. In addition, a plurality of fixing plates 241 may be located to be spaced apart from each other in a state of standing in the upper and lower direction.

Moreover, the fixing plate 241 may be positioned to face the bonding plate 210 with the electrode lead 111 interposed therebetween. For example, as shown in FIG. 10, the fixing plate 241 may be formed to press the other side surface in the left and right direction at one end of the electrode lead 111 such that one side surface in the left and right direction at one end of the electrode lead 111 is closely adhered to the left and right side portions of the bonding plates 210, 211.

In addition, the fixing plate 241 may be configured to be movable on the front surface of the main frame 230. That is, the fixing plate 241 may be configured to be movable in the left and right direction on the front surface of the main frame 230 so that one end of the electrode lead 111 is closely adhered to each side portion of the bonding plates 210, 211.

For example, as shown in FIG. 10, a guide bar 245 may be formed at the front surface of the main frame 230 so that the fixing plate 241 is guided to move in the left and right direction. However, the guide bar 245 is not limited to the structure for moving the fixing plate 241, but any moving unit capable of precisely moving the fixing plate 241 in the left and right direction may be used.

According to this configuration of the present disclosure, the left and right side surfaces at one end of the electrode lead 111 may be welded with high reliability to the left and right side portions of the bonding plate 210 of the bus bar 201, and thus the electrode lead 111 and the bus bar 201 may be bonded firmly.

Figure 11:
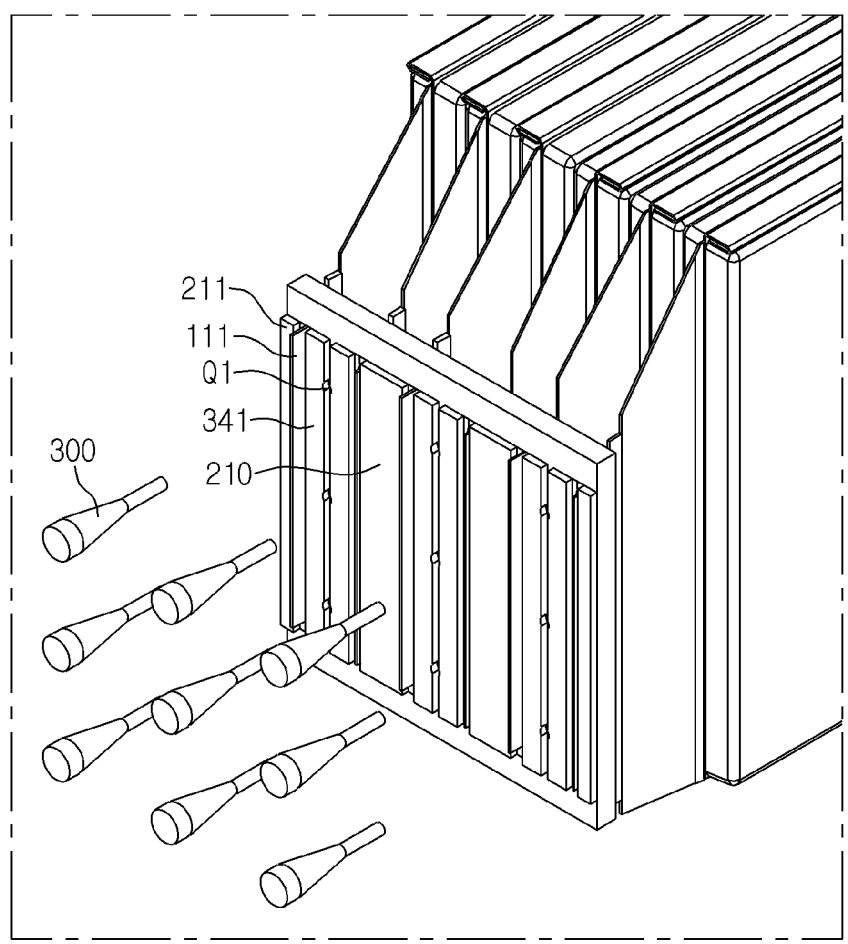
FIGS. 11 and 12 are perspective views for illustrating a bonding process of a bus bar and an electrode lead of a secondary battery employed at the battery module according to another embodiment of the present disclosure.
Figure 12:
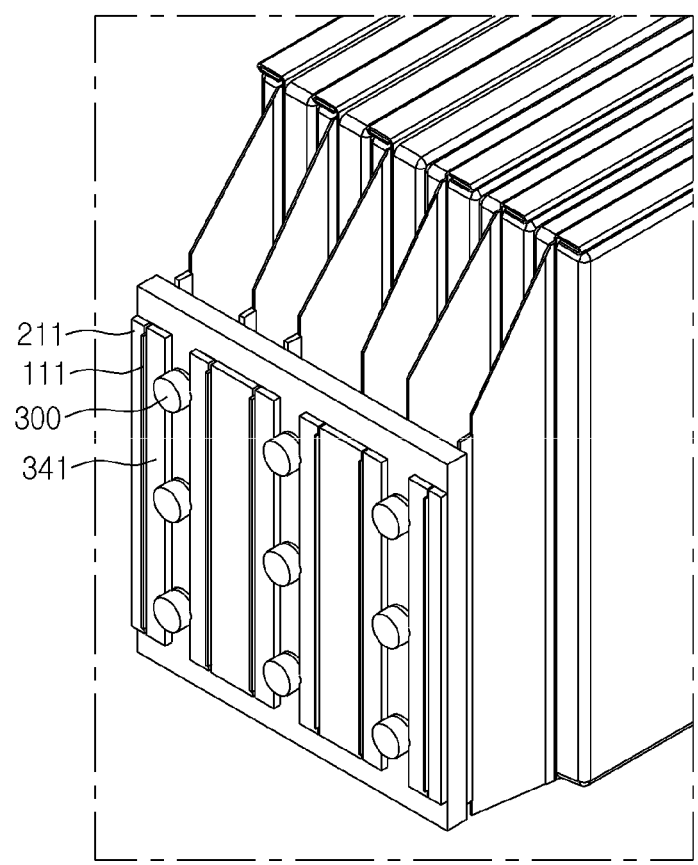

FIGS. 11 and 12 are perspective views for illustrating a bonding process of a bus bar and an electrode lead of a secondary battery employed at the battery module according to another embodiment of the present disclosure.

Referring to FIGS. 11 and 12, the opening Q1 formed at the extension 235 is utilized in a way that a bolt 300 is inserted into the opening Q1 to transmit a pressing force for moving the fixing plate 341 in the left and right direction so that the left and right side surfaces of the electrode lead 111 are closely adhered to the left and right side portions of the bonding plates 210, 211 of the bus bar 200 while the bus bar 200 and the electrode lead 111 are being bonded.

For example, as shown in FIGS. 5 and 11, the fixing plate 341 may be positioned adjacent to the front surface of the extension 235 at which the opening Q1 is formed. After that, as shown in FIGS. 5 and 12, the bolt 300 having a tapered structure with a diameter reduced toward a distal end is inserted into the opening Q1 formed in the extension 235, and the inserted bolt 300 presses the fixing plate 341 to be moved toward the bonding plate 210, so that one end of the electrode lead 111 is closely adhered to the side portions of the bonding plates 210, 211.

Figure 13:
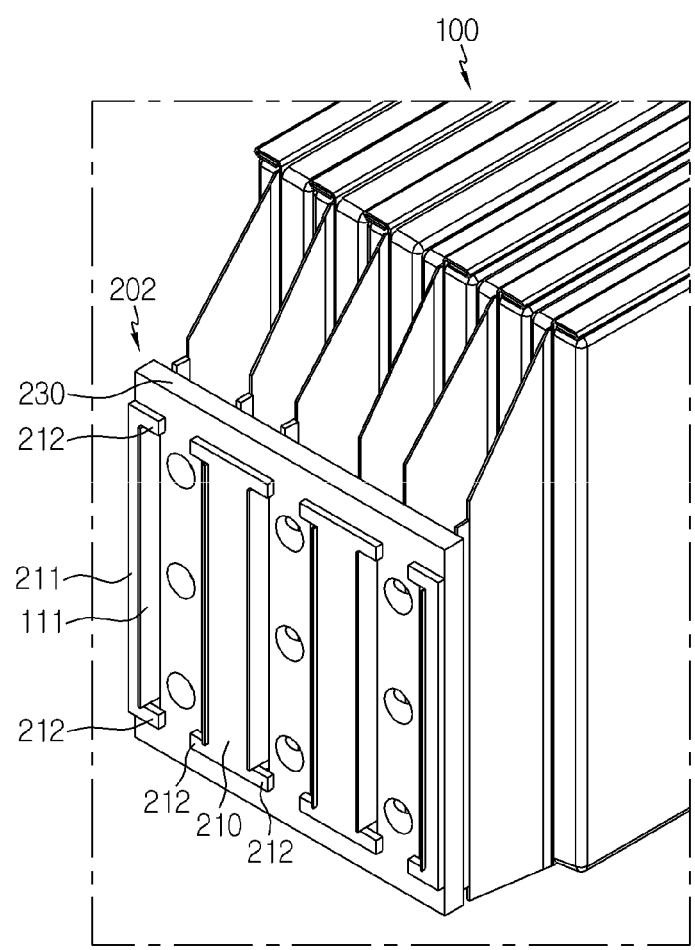
FIG. 13 is a perspective view showing an example of secondary batteries and bus bars employed at a battery module according to still another embodiment of the present disclosure.

FIG. 13 is a perspective view showing an example of secondary batteries and bus bars employed at a battery module according to still another embodiment of the present disclosure.

Referring to FIG. 13, a bus bar 202 according to still another embodiment of the present disclosure may have at least one protrusion 212 formed at the side portion of the bonding plates 210, 211 to protrude in a left or right direction, based on the direction along which the electrode lead 111 protrudes.

Specifically, the protrusion 212 may be formed at a top portion or a bottom portion of one side portion or the other side portion of the bonding plates 210, 211, or at the top portion and the bottom portion thereof. For example, as shown in FIG. 13, two protrusions 212 may be formed at the top portion and the bottom portion of one side portion 215 and the other side portion 216 of the bonding plate 210 in the left and right direction, respectively, or two protrusions 212 may be formed at the top portion and the bottom portion of the other side portion of the bonding plate 211.

In addition, the protrusion 212 may be bonded to the upper or lower surface of one end of the electrode lead 111. For example, as shown in FIG. 13, two protrusions 212 formed at the bonding plate 211 may be bonded to the upper and lower surfaces of one end of the electrode lead 111.

According to this configuration, the bus bar 202 according to still another embodiment of the present disclosure may further increase the bonding area between the electrode lead 111 and the bonding plate 210, and the electrode lead 111 and the bus bar 202 may be bonded more firmly.

A battery pack according to the present disclosure may include one or more battery modules 400 according to the present disclosure. In addition, the battery pack according to the present disclosure may further include, in addition to the battery module 400, a pack case for accommodating the battery module 400, various devices for controlling charge and discharge of the battery module 400 such as a battery management system (BMS), a current sensor, a fuse and the like.

In addition, the battery pack according to the present disclosure may be applied to a vehicle such as an electric vehicle or a hybrid electric vehicle. In other words, the vehicle according to the present disclosure may include the battery pack of the present disclosure.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, in particular, the present disclosure may be applied to industries associated with a battery pack configured using the battery modules and a vehicle driven by the battery pack, for example an electrical vehicle.

What is claimed is:

1. A battery module, comprising:
a plurality of pouch-type secondary batteries arranged to be stacked in at least one direction, each secondary battery having an electrode lead; and
a bus bar made of an electrically conductive material and bonded to at least two electrode leads of corresponding secondary batteries to electrically connect the corresponding secondary batteries to each other,
wherein each bonded electrode lead is configured to protrude from the corresponding secondary battery in a front and rear direction, and at least one of left and right side surfaces of each bonded electrode lead is bonded to the bus bar,
wherein the left and right side surfaces of each bonded electrode lead have larger areas than upper and lower surfaces of each bonded electrode lead, and
wherein the left and right side surfaces of each bonded electrode lead are not bent into contact with the bus bar.

2. The battery module according to claim 1,
wherein the bus bar includes a main frame having at least one hole formed therein so that one end of each bonded electrode lead extends therethrough, the at least one hole having at least one inclined surface so that a width of the hole in the horizontal direction is continuously increased in a direction along which each bonded electrode lead is inserted into the hole.

3. The battery module according to claim 2,
wherein the bus bar includes a main frame having at least one hole formed therein so that one end of each bonded electrode lead extends therethrough and a bonding plate having a front surface, a rear surface and side portions, based on the front and rear direction, and
wherein one side portion of the bonding plate is bonded to one side surface of the left or right side surface of one of the bonded electrode leads.

4. The battery module according to claim 3,
wherein the bonding plate is bonded to a front surface of the main frame so that an outwardly exposed front surface of the bonding plate protrudes to the front, based on an outwardly exposed front surface of the main frame.

5. The battery module according to claim 4,
wherein at least one protrusion is formed at the one side portion of the bonding plate to protrude in a left direction or a right direction, and
wherein the at least one protrusion is bonded to an upper or lower surface of one end of the one of the bonded electrode leads.

6. The battery module according to claim 5,
wherein the at least one protrusion is formed at a top portion or a bottom portion of the one side portion of the bonding plate, or the top portion and the bottom portion of the one side portion of the bonding plate.

7. The battery module according to claim 4, wherein at least one protrusion is formed at each of the side portions of the bonding plate.

8. The battery module according to claim 3,
wherein the bus bar further includes at least one fixing plate closely adhered to the one of the bonded electrode leads, and
wherein the fixing plate presses the other side surface of the left or right side surface of the one of the bonded electrode leads so that the one side surface of the one of the bonded electrode leads is closely adhered to the one side portion of the bonding plate.

9. The battery module according to claim 8, wherein the bus bar further includes at least one guide plate, the guide plate being connected to the fixing plate, the guide plate being configured to move the fixing plate in a left direction and a right direction.

10. The battery module according to claim 1, wherein the bus bar includes a main frame having at least one hole formed therein so that one end of each bonded electrode lead extends therethrough, the main frame including:
a bar-shaped top bar located at an upper portion of the main frame and extending in a horizontal direction, when the main frame stands up in an upper and lower direction;
a bar-shaped bottom bar located at a lower portion of the main frame and extending in the horizontal direction; and
an extension configured to connect the top bar and the bottom bar.

11. The battery module according to claim 10,
wherein the extension has at least one inclined surface so that a thickness of the extension in the horizontal direction is continuously increased in a direction along which each bonded electrode lead is inserted into the hole.

12. The battery module according to claim 10,
wherein the extension has at least one opening perforated in a direction along which each bonded electrode lead is inserted into the hole.

13. A battery pack, comprising a battery module according to claim 1.

14. A vehicle, comprising the battery pack according to claim 13.

15. A battery module, comprising:
- a plurality of pouch-type secondary batteries arranged to be stacked in at least one direction, each secondary battery having an electrode lead; and
- a bus bar made of an electrically conductive material and bonded to at least two electrode leads of corresponding secondary batteries to electrically connect the corresponding secondary batteries to each other,
- wherein each bonded electrode lead is configured to protrude from the corresponding secondary battery in a front and rear direction, and at least one of left and right side surfaces of each bonded electrode lead is bonded to the bus bar,
- wherein the left and right side surfaces of each bonded electrode lead have larger areas than upper and lower surfaces of each bonded electrode lead,
- wherein the bus bar includes a main frame having at least one hole formed therein so that one end of each bonded electrode lead extends therethrough,
- wherein the bus bar includes a bonding plate having a front surface, a rear surface and side portions, based on the front and rear direction,
- wherein one side portion of the bonding plate is bonded to one side surface of the left or right side surface of one of the bonded electrode leads,
- wherein the bus bar further includes at least one fixing plate closely adhered to the one of the bonded electrode leads, and
- wherein the fixing plate presses the other side surface of the left or right side surface of the one of the bonded electrode leads so that the one side surface of the one of the bonded electrode leads is closely adhered to the one side portion of the bonding plate.

* * * * *